(12) United States Patent
Cho et al.

(10) Patent No.: US 6,311,012 B1
(45) Date of Patent: *Oct. 30, 2001

(54) APPARATUS AND METHOD FOR REPRODUCING MULTIPLE CAMERA-ANGLE SIGNALS FROM A DISC

(75) Inventors: Jae-Ryong Cho; Seong-Ju Lee, both of Kong-In (KR)

(73) Assignee: LG Electronics Inc., Seoul (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/879,934

(22) Filed: Jun. 20, 1997

(30) Foreign Application Priority Data

Jun. 21, 1996 (KR) .................................. 96-22888

(51) Int. Cl.[7] .............................. H04N 5/76; H04N 5/781
(52) U.S. Cl. ........................ 386/98; 386/125; 386/126
(58) Field of Search ......................... 386/95, 98, 125, 386/126; 345/328, 333, 334, 339, 348–351; 348/563, 581, 722; 369/112; 358/183; 395/335

(56) References Cited

U.S. PATENT DOCUMENTS

| | | | |
|---|---|---|---|
| 4,774,582 | * 9/1988 | Hakamada et al. | 358/183 |
| 5,353,121 | * 10/1994 | Young et al. | 348/563 |
| 5,687,332 | * 11/1997 | Kurahashi et al. | 395/335 |
| 5,832,175 | * 11/1998 | Hirayama et al. | 386/125 |
| 5,867,229 | * 2/1999 | Stevens | 348/722 |
| 5,870,523 | * 2/1999 | Kikuchi et al. | 386/95 |
| 5,911,032 | * 6/1999 | Hirayama et al. | 386/95 |
| 5,920,537 | * 7/1999 | Komma et al. | 369/112 |

FOREIGN PATENT DOCUMENTS 19540661  5/1996  (DE) .

* cited by examiner

*Primary Examiner*—Thai Tran

(57) ABSTRACT

The method and apparatus for reproducing data from a disk receives at least video data read from a disk such as a digital video disk or a digital versatile disk. At least a portion of the video data is then processed to produce image data such that different camera angle images are simultaneously displayed.

45 Claims, 6 Drawing Sheets

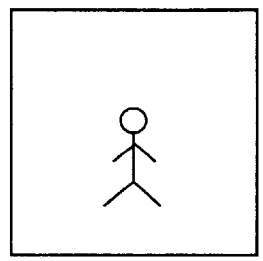
FIG. 1A
(PRIOR ART)
|  |  |  |
|---|---|---|
| A1 | A2 | A3 |
| A4 | A5 | A6 |
| A7 | A8 | A9 |
FIG. 1B
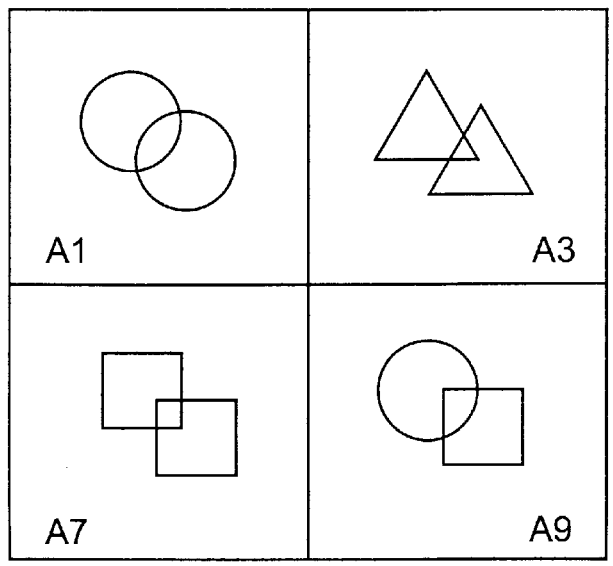
FIG. 1C

APPARATUS AND METHOD FOR REPRODUCING MULTIPLE CAMERA-ANGLE SIGNALS FROM A DISC

BACKGROUND OF THE INVENTION

1. Field of the Invention

The present invention relates to an apparatus and method for reproducing signals from a disc; and more particularly, for reproducing multiple camera-angle signals from a Digital Versatile Disc or Digital Video Disc (DVD).

2. Description of Related Art

A DVD is manufactured by masking image signals into digital form, and allows for many diverse functions. For instance, the image signals for multiple camera angles may be recorded on a DVD.

FIG. 2 illustrates, conceptually, the arrangement of data on a DVD. As shown, the image data representing a scene for each camera angle are grouped into angle blocks. Angle block 1, for instance, includes the image data for each camera angle of the first scene.

FIGS. 3A–3E illustrate the data format of the image data stored on the DVD. As shown in FIGS. 3A and 3B, predetermined amounts of image data are each represented by a Video Object Set (VOB) and collectively as Video Object Sets (VOBS). A VOB consists of multiple cells of image data as shown in FIG. 3C. Each cell in a VOB corresponds to an angle block as shown in FIG. 2, and includes image data for a scene. Also, each cell consists of a plurality of Video Object Units (VOBU) as shown in FIG. 3D. Because scenes have different amounts of data, the amount of data in different cells can differ.

Each VOBU consists of a navigation packet (NV PCK), a plurality of video packets (V PCK), and an audio packet (A PCK) as shown in FIG. 3E. A navigation packet includes navigation data regarding, for instance, the video data stored in the video packets. The video data stored in video packets is encoded according to the well-known MPEG standard.

A conventional DVD reproducing apparatus reproduces the digital data recorded on a DVD. When the image signals for multiple camera angles (e.g., nine camera angles) are recorded on a DVD, a conventional DVD reproducing apparatus allows a user to select one of the images corresponding to one of the camera angles for viewing as shown in FIG. 1A. Specifically, the conventional DVD reproducing apparatus navigates from the video data for the selected camera angle in one angle block or cell to the video data for the selected camera angle in the next angle block or cell. If, the user changes camera angles, a jump is made as shown in FIGS. 2 and 3D to the video data in the next angle block or cell corresponding to the newly selected camera angle. Unfortunately, the conventional DVD reproducing apparatus does not allow simultaneous viewing of more than one camera angle.

As a result, a user must sequentially view the images corresponding to each camera angle to gain an appreciation of the differences between the camera angles. It is, however, not easy to gain an appreciation of the differences between the camera angles in this manner. Consequently, it is difficult for a user to select an optimal camera angle for viewing.

SUMMARY OF THE INVENTION

It is an object of the present invention to provide a reproducing method and apparatus which overcome the disadvantages and problems discussed above with respect to the conventional art.

Another object of the present invention is to provide a reproducing method and apparatus which simultaneously display image signals corresponding to a plurality of camera angles.

These and other objects are achieved by providing (a) receiving at least video data read from a disk; (b) processing at least a portion of said received video data to produce image data such that different camera angle images are simultaneously displayed.

These and other objects are further achieved by providing receiving means receiving at least video data read from a disk; and processing means for processing at least a portion of said video data to produce image data such that different camera angle images are simultaneously displayed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1A illustrates the display of a single camera angle;

FIGS. 1B and 1C illustrate displays of multiple camera angles;

DETAILED DESCRIPTION OF THE PREFERRED EMBODIMENTS

Figure 2:
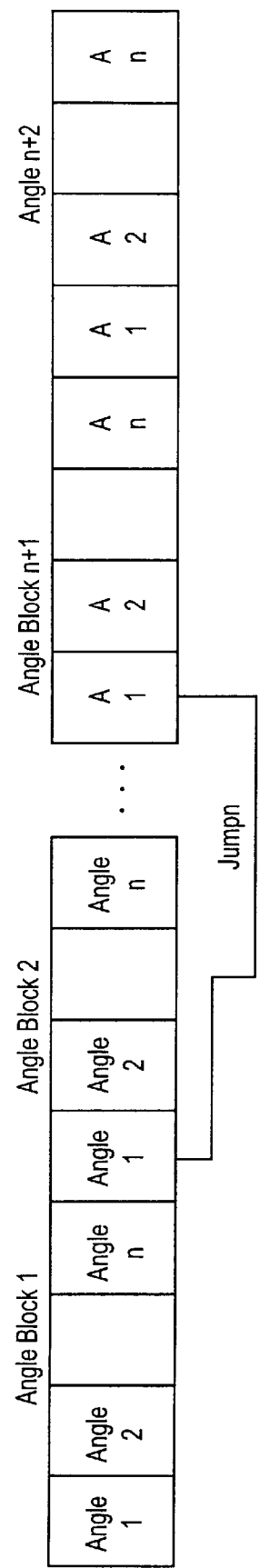
FIG. 2 illustrates, conceptually, the arrangement of data on a DVD.
Figures 3A, 3B, 3C, 3D, 3E:
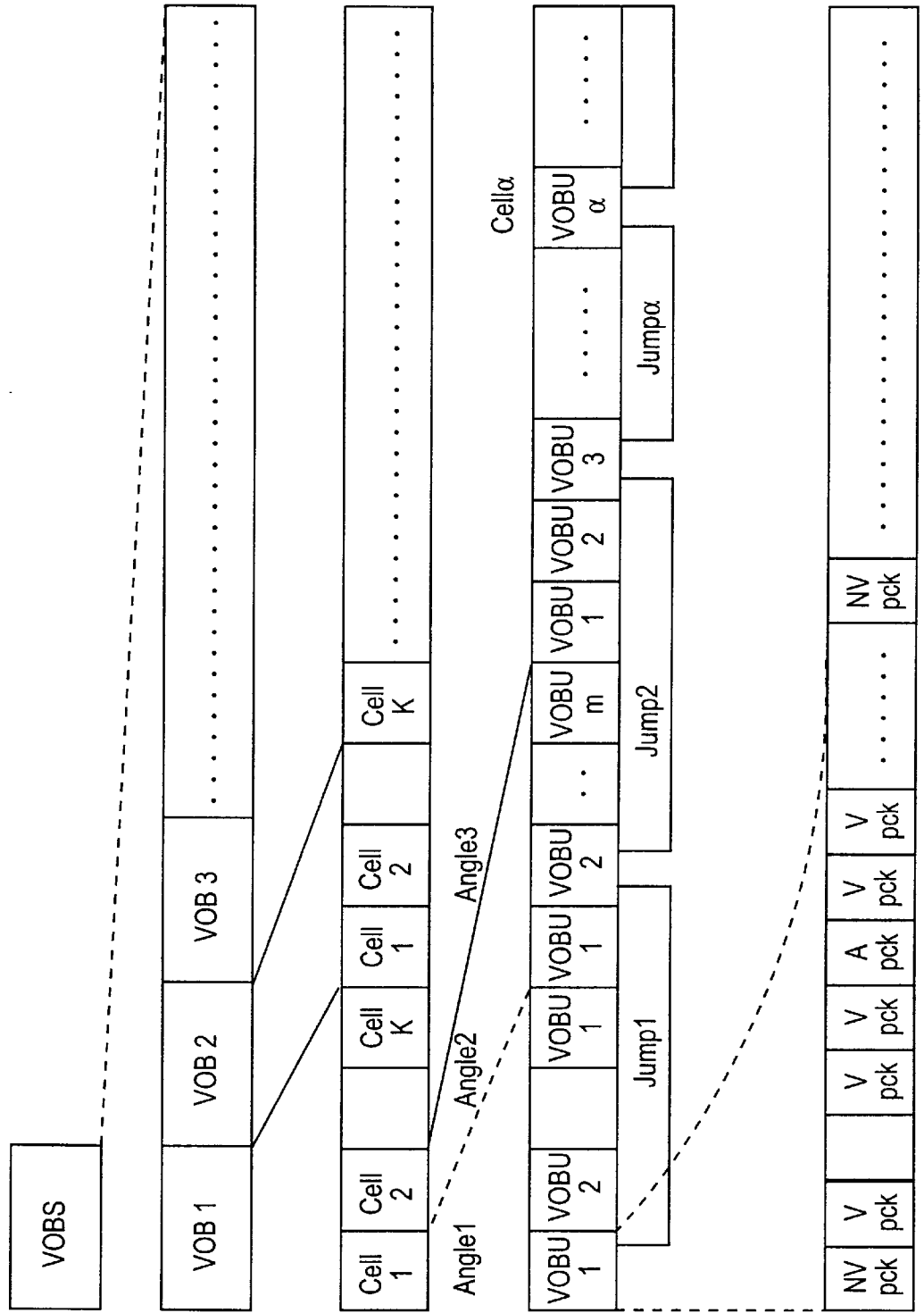
FIGS. 3A–3E illustrate the data format of the video data stored on a DVD.
Figure 4:
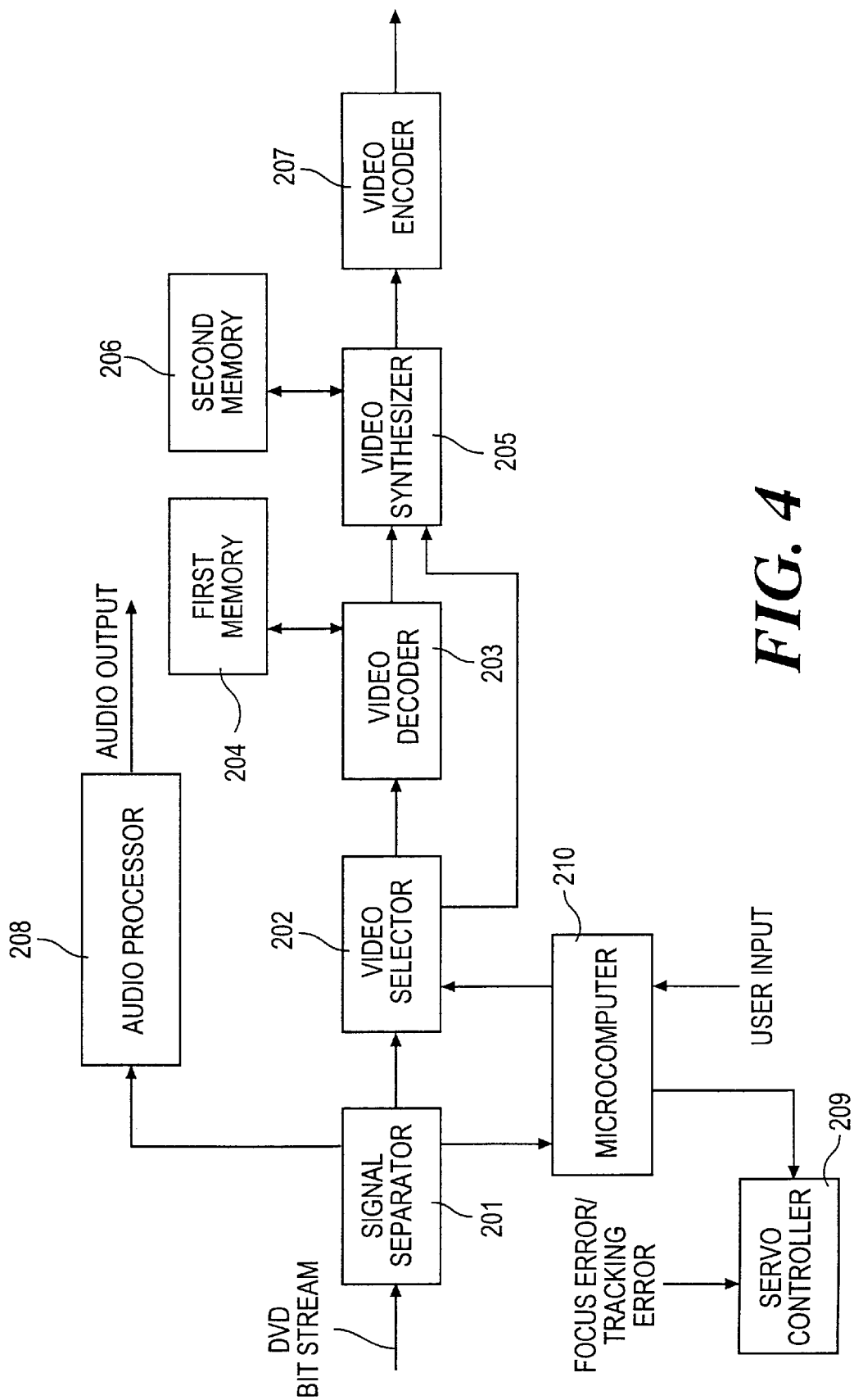
FIG. 4 illustrates the reproducing apparatus according to the present invention.

FIG. 4 illustrates the reproducing apparatus according to the present invention. As shown in FIG. 4, a signal separator 201 receives a bit stream reproduced from a DVD. The signal separator 201 separates the bit stream into a video bit stream and an audio bit stream, sends the audio bit stream to an audio processor 208, sends the video bit stream to a video selector 202, and sends format or header information in the video bit stream to the microcomputer 210.

The audio processor 208 generates an audio output from the audio bit stream. The microcomputer 210 also receives user input, and based on the format information and the user input generates servo control data and video control data. The servo control data is supplied to a servo controller 209 which controls focus and tracking of the data reproducing element (not shown) in a well-known manner. The video control data is supplied to the video selector 202.

The video selector 202 processes the received video bit stream based on the video control data, and outputs a video bit stream to a video decoder 203. The video decoder 203 stores the received video bit stream in a first memory 204, and decodes the received video bit stream. The decoder 203 outputs the resulting decoded video data to a video synthesizer 205.

Besides the decoded video data, the video synthesizer 205 also receives a portion of the video control data output by the micro-computer 210 from the video selector 202. The video synthesizer 205 stores the decoded video data in a second memory 206. Based on the stored video data and the video control data, the video synthesizer 205 generates image data. A video encoder 207 receives and encodes the image data for display.

Figure 5A:
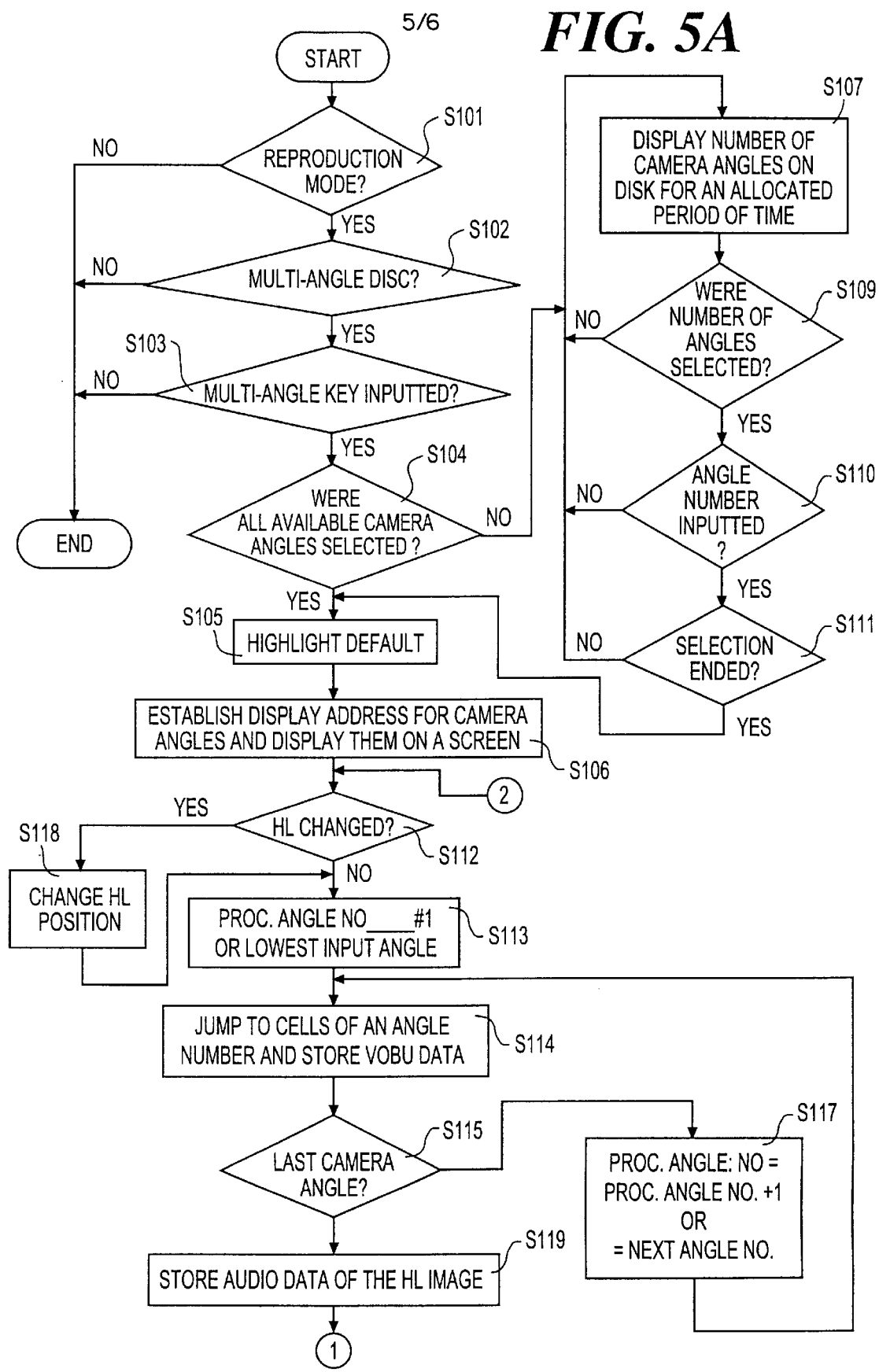
FIGS. 5A and 5B illustrate a flow chart of the reproducing process according to the present invention implemented by the reproducing apparatus of FIG. 4.
Figure 5B:
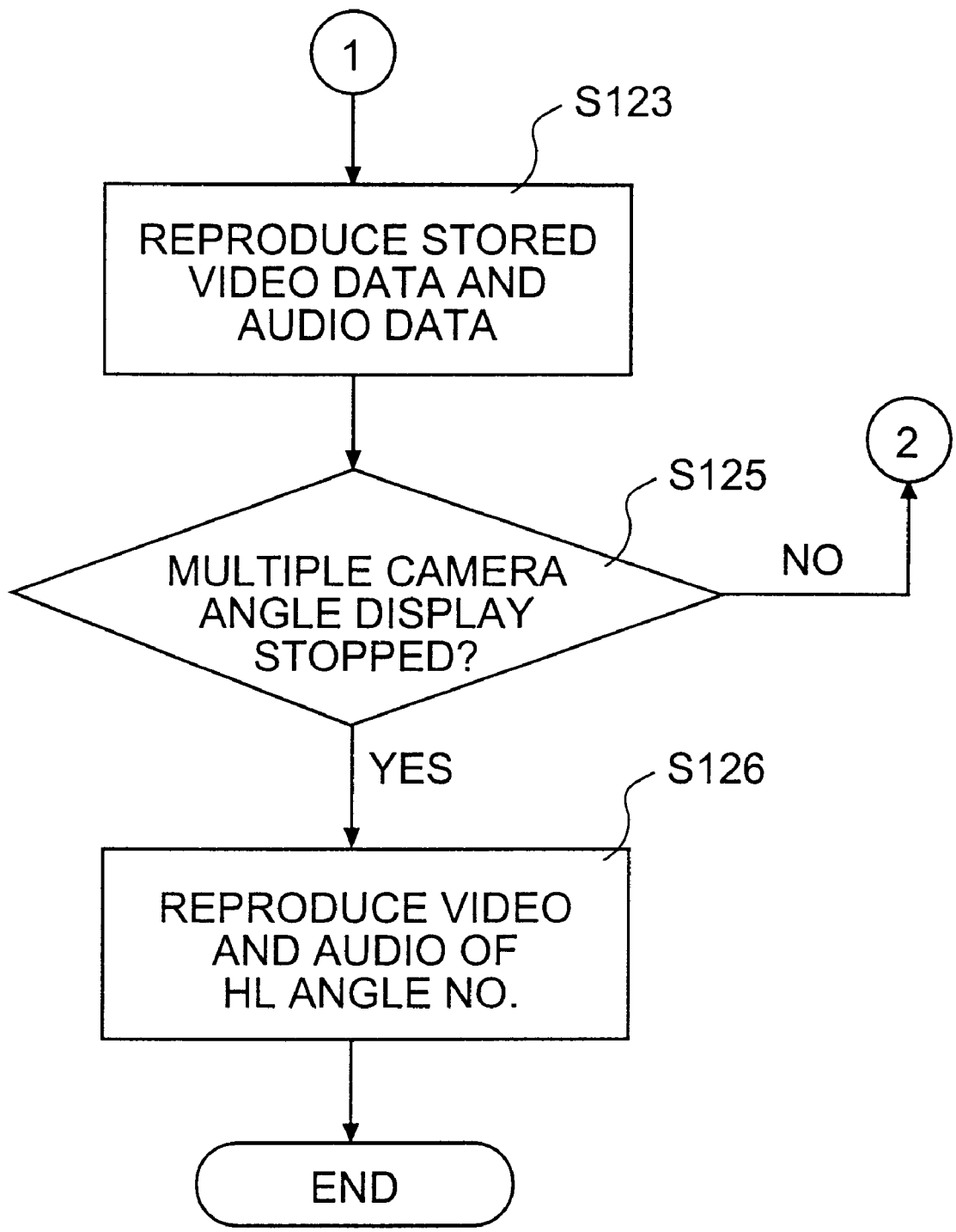

Next, operation of the reproducing apparatus will be described in detail with respect to FIGS. 4, 5A and 5B. Referring to FIG. 5A, in step S101, the microcomputer 210 receives user input and determines therefrom whether a reproduction mode has been selected.

If a reproduction mode has not been selected, processing ends. If a reproduction mode has been selected, a bit stream is reproduced from a DVD. As shown in FIG. 4, the signal separator 201 receives the reproduced bit stream, separates the bit stream into a video bit stream and an audio bit stream, sends the audio bit stream to the audio processor 208, sends the video bit stream to a video selector 202, and sends format information in the video bit stream to the microcomputer 210.

The microcomputer 210 determines from the format information whether the DVD stores video data for multiple camera angles in step S102. If the DVD does not store video data for multiple camera angles, processing ends. Otherwise, the microcomputer 210 determines the total number of camera angles which can be reproduced from the DVD based on the format information, and processing proceeds to step S103. In step S103, the microcomputer 210 determines from the user input, e.g., depression of a multi-angle key (not shown), whether the user has requested the display of multiple camera angles. If so, processing proceeds to step S104; otherwise, processing ends.

In step S104, the microcomputer 210 determines based on user input whether the user has selected all possible camera angles for simultaneous display. If so, processing proceeds to step S105; otherwise, processing proceeds to step S107. In step S107, the microcomputer 210 communicates with the video synthesizer 205 via the video selector 202, and instructs the video synthesizer 205 to display, for an allotted period of time, a message indicating the total number of camera angles which can be reproduced from the DVD.

Then, in step S109 the microcomputer 210 determines whether the user has selected a total number of camera angles for display within a predetermined period of time. If a total number of camera angles for display has been selected, processing proceeds to step S110; otherwise, processing returns to step S107. In step S110, the microcomputer 210 determines whether the user has entered camera angles for display within a predetermined period of time. If entered, processing proceeds to step Slll; otherwise, processing returns step S107.

Next, in step S111, the microcomputer 210 determines whether the number of camera angle numbers entered for display by the user in step S110 equals the total number of camera angles for display entered by the user in step S109. If equal, processing proceeds to step S105; otherwise, processing returns to step S107.

In step S105, one of the camera angles for display is selected for display in a highlighted format. The camera angle selected for display in the highlighted format (hereinafter "the highlighted camera angle") is selected according to a default. For example, the camera angle assigned the lowest angle number is the default camera angle for display in the highlighted format.

Then, in step S106, the microcomputer 210 establishes display addresses for each camera angle to be displayed, and outputs the display addresses to the video synthesizer 205 via the video selector 202 so that the multiple camera angles will be displayed such as shown, for example, in FIGS. 1B and 1C. In step S112, the microcomputer 210 determines based on user input whether the user wants to change the highlighted camera angle. If so, processing proceeds to step S118; otherwise, processing proceeds to step S113. In step S118, the user enters the number of a camera angle to be displayed in the highlighted format. If this number matches one of the camera angles to be displayed, then the user input is accepted and processing proceeds to step S113. Otherwise, the user input is not accepted, and processing does not proceed to step S113 until an acceptable camera angle number is input.

In step S113, the first camera angle to be processed for the multiple camera angle display is set as camera angle number one when all available camera angles were selected for display in step S104, and is set as the lowest camera angle number entered by the user in step S110 if all available camera angles were not selected for display in step S104. Then in step S114, the microcomputer 210 causes the video selector 202 to output data from the VOBUs in the cell corresponding to the camera angle to be processed. Specifically, the microcomputer 210 instructs the video selector 202 to output only the minimum amount of data necessary to display an image from the VOBUs in a cell (i.e., the intra- or I-picture data).

The video decoder 203 temporarily stores this data in the first memory 204, decodes the data, and outputs the decoded data to the video synthesizer 205. The video synthesizer stores the decoded data in the second memory 206 based on the display addresses received from the microcomputer 210.

This process is then repeated for each camera angle to be displayed in the multiple camera angle display. Namely, in step S115, the microcomputer 210 determines if the current camera angle to be displayed equals the highest numbered camera angle to be displayed. If not, processing proceeds to step S117; otherwise, processing proceeds to step S119. In step S117 the number of the camera angle to be displayed is increased by one if all available camera angles were selected for display in step S104. Alternatively, the number of the camera angle to be displayed is set to the next highest camera angle to be displayed, which was entered by the user in step S110, if all available camera angles were not selected for display in step S104. Steps S114 and S115 are then repeated.

Steps S117, S114 and S115 will continue to be repeated until the current camera angle to be displayed equals the highest number of a camera angle to be displayed. When this occurs, processing proceeds from step S117 to step S119.

In step S119, the microcomputer 210 controls the servo controller 209 such that the audio data corresponding to the camera angle to be displayed in the highlighted format is reproduced. The video separator 201 outputs the reproduced audio data to the audio processor 208.

In step S123, the audio processor 208 outputs the audio data corresponding to the highlighted camera angle, and the video synthesizer 205 generates image data for a multiple camera angle display based on the video data stored in the second memory. Each camera angle for display in the multiple camera angle display is positioned according to its storage location in the second memory (i.e., the display address).

Based on instructions received by the microcomputer 210 via the video separator 202, the video synthesizer 205 generates the image data corresponding to the highlighted camera angle such that the highlighted camera angle is displayed in the highlighted format.

Additionally, in accordance with the instructions received from the microcomputer 210, the video synthesizer 205 generates the image data such that the camera angle number for each camera angle in the multiple camera angle display appears in a portion of the multiple camera angle display corresponding to that camera angle number. Then, the video encoder 207 encodes the image data and outputs the encoded image data for display.

Processing proceeds to step S125 and the microcomputer 210 determines whether the user has selected to stop multiple camera angle display. If multiple camera angle display has not been stopped, processing proceeds to step S112; otherwise, processing proceeds to step S126. In step S126, the video and audio data corresponding to the camera angle displayed in the highlighted format is solely reproduced in the well-known manner.

Because the reproducing apparatus according to the present invention only reproduces the smallest amount of data from the VOBUs necessary to display an image, as opposed to reproducing all the video data in the VOBU, the video decoder 203 decodes a significantly less amount of data compared to conventional reproducing apparatuses. Therefore, the reproducing apparatus according to the present invention can simultaneously display multiple camera angles using a single decoder.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of reproducing data from a disk, comprising the steps of:
   (a) receiving at least video data read from said disk, said received video data divided into a plurality of cells, each cell including video data associated with a different camera angle;
   (b) processing a portion of each cell in a number of said plurality of cells to produce image data such that different camera angle images are simultaneously displayed.

2. The method of claim 1, wherein
said step a) receives video data and format information read from the disk, said received video data is composed of at least one video object, which is part of an MPEG 2 program stream, said video object is divided into said plurality of cells, each cell is divided into video object units, each of which is an integer number of video fields, and each video object unit is divided into video packs;
said step b) processes said portion of each cell in said number of said pluralitv of cells when said format information indicates that said disk stores video data for multiple camera angles; and further including,
c) temporarily storing output of said step b).

3. The method of claim 2, wherein said portion of each cell is one of the video object units or one of the video packs.

4. The method of claim 3, wherein said portion of each cell is intra-picture data.

5. The method of claim 1, wherein said portion of each cell is intra-picture data.

6. The method of claim 1, wherein said number of cells is less than said plurality of cells corresponding to different camera angles.

7. The method of claim 2, further comprising:
   (d) judging whether said disk stores video data representing more than one camera angle image based on said received format information; and wherein
   said step (b) processes said portion of each cell in said number of said plurality of cells when said step (d) judges that said disk stores video data representing more than one camera angle image.

8. the method of claim 1, further comprising:
   (d) receiving user input indicating whether to display more than one camera angle image simultaneously; and wherein
   said step (b) processes said portion of each cell in said number of said plurality of cells when said user input indicates to display more than one camera angle image simultaneously.

9. The method of claim 1, wherein said portion is a minimum amount of video data to display one of said different camera angle images.

10. A method of reproducing data from a disk, comprising the steps of:
    (a) receiving at least video data and format information read from a disk, said received format information indicating a number of multiple camera angles represented by said received video data;
    (b) determining a number of camera angles which can be reproduced from the disk based on said received format information;
    (c) determining from user input whether the user has requested all possible camera angles or a subset thereof for simultaneous display; and
    (d) processing portions of said received video data to produce image data when said user input received in said step (c) indicates to display more than one camera angle image simultaneously.

11. The method of claim 10, further comprising:
    (e) displaying a message indicating said number of camera angles which can be reproduced from the disk.

12. The method of claim 10, wherein said step (c) determines whether said user has selected all possible camera angles or a subset thereof for simultaneous display within a predetermined period of time.

13. The method of claim 10, further comprising:
    (e) receiving user input which designates one of said camera angle images being simultaneously displayed;
    (f) receiving user input on whether to solely display said designated camera angle image;
    (g) controlling a reproducing element to read video data corresponding to said designated camera angle image from said disk when said step (f) receives user input instructing to solely display said designated camera angle image; and
    (h) processing said video data read in step (g) to produce image data representing said designated camera angle image.

14. The method of claim 13, wherein said step (b) processes said portions of said received video data such that said designated camera angle image is displayed in a highlighted format.

15. The method of claim 10, further comprising:
(e) receiving user input which designates one of said camera angle images being simultaneously displayed; and wherein
said step (b) processes said portions of said received video data such that said designated camera angle image is displayed in a highlighted format.

16. The method of claim 15, wherein
said step (a) further receives audio data; and further including
(f) outputting portions of said received audio data corresponding to said designated camera angle image to be displayed in said highlighted format.

17. The method of claim 10, wherein said portion is a minimum amount of video data to display one of said different camera angle images.

18. A method of reproducing data from a disk, comprising the steps of:
(a) receiving at least video data, audio data and format information read from a disk, said received format information indicating a number of multiple camera angles represented by said received video and audio data;
(b) judging whether said disk stores video data and audio data associated with more than one camera angle image based on said received format information;
(c) receiving user input requesting multiple camera angles for simultaneous display when said step (b) judges that said disk stores video data representing more than one camera angle image;
(d) receiving user input which designates one of said camera angle images;
(e) processing portions of said received video data to produce image data for multiple camera angles when said user input received in said step (c) indicates to display more than one camera angle image simultaneously;
(f) processing portions of said received audio data associated with said designated camera angle image; and
(g) outputting the audio data corresponding to the desired camera angle simultaneously with the simultaneous dispIlay of more than one camera angle image.

19. The method of claim 18, wherein said step (a) separates said received video data and said received audio data.

20. The method of claim 18, further comprising:
(g) displaying a message indicating said number of camera angles which can be reproduced from said disk.

21. The method of claim 18, wherein said step (c) determines whether a user has selected all possible camera angles or a subset thereof for display within a predetermined period of time.

22. The method of claim 18 wherein said step (e) processes said portions of said received video data such that said designated camera angle image is displayed in a highlighted format.

23. The method of claim 22, wherein the step (e) processes said portions of said video data such that said camera angle selected for display in said highlighted format is a default camera angle if said step (d) does not receive user input within a predetermined period of time.

24. The method of claim 18, wherein said portion is a minimum amount of video data to display one of said different camera angle images.

25. An apparatus for reproducing data from a disk, comprising:
receiving means for receiving at least video data and audio data read from a disk;
processing means for processing portions of said video data to produce image data such that different camera angle images are simultaneously displayed;
a controller receiving user input which designates one of said camera angle images being simultaneously displayed, and controlling said processing means to produce said image data such that said designated camera angle image is displayed in a highlighted format and such that said audio data corresponding to said designated camera angle is simultaneously output.

26. The apparatus of claim 25, further comprising:
a signal separator separating said received video data and said received audio data.

27. The apparatus of claim 25, wherein said processing means further comprises:
a video selector separating video data portions corresponding to each camera angle image from said received video data, each video data portion being a minimum unit of data to display a camera angle image; and
a synthesizer synthesizing at least said video data portions to produce image data representing a synthesized image of multiple camera angle images.

28. The apparatus of claim 27, wherein said controller causes said video selector to output said video data portions necessary to display said image data of said different camera angle images.

29. The apparatus of claim 25, wherein said portion is a minimum amount of video data to display one of said different camera angle images.

30. An apparatus for reproducing data from a disk, comprising:
a receiving unit to receive at least video data read from a disk, said video data being composed of a video object (VOB), which is part or all of an MPEG 2 program stream, said video object (VOB) being divided into one or more cells, each of which being a group of pictures, each cell divided into video object units (VOBU), each of which is an integer number of video fields, each video object unit (VOBU) being divided into video packs;
a signal processor coupled to said receiving unit, processing a portion of each cell to produce image data such that different camera angle images are displayed simultaneously, said signal processor including,
a video selector separating said portion of each cell,
a single decoder decoding output from said video selector, and
a synthesizer synthesizing output from said decoder to produce image data representing a synthesized image of said different camera angles; and
a controller receiving user input indicating whether to display more than one camera angle image simultaneously, and controlling said signal processor to process said portion of each cell when said user input indicates to display more than one camera angle image simultaneously.

31. The apparatus of claim 30, further comprising:
a storing unit, coupled to said decoder, temporarily storing said output from said decoder.

32. The apparatus of claim 30, wherein said portion of each cell is a VOBU, intra picture data, or a video pack.

33. The apparatus of claim 30, wherein said receiving unit further receives audio data; and said controller controls said signal processor such that portions of said received audio data corresponding to said designated camera angle image are reproduced.

34. The apparatus of claim 30, wherein said portion is a minimum amount of video data to display one of said different camera angle images.

35. A method of reproducing data from a disk, comprising steps of:

(a) receiving at least video data and format information read from a disk, said received format information indicating a number of multiple camera angles represented by said received video data;

(b) judging whether said disk stores video data representing more than one camera angle image based on said received format information;

(c) receiving user input requesting multiple camera angles for simultaneous display when said step (b) judges that said disk stores video data representing more than one camera angle image; and (d) processing portions of said received video data to produce image data for multiple camera angles such that a default one of the multiple camera angles for simultaneous display is displayed in a highlighted format when said user input received in said step (c) indicates to display more than one camera angle image simultaneously.

36. The method of claim 35, wherein the camera angle assigned a lowest angle number is the default camera angle for display in the highlighted format.

37. The method of claim 35, wherein said step (a) receives said video data, said format information and audio data; and further including, (e) separating said received video data and said received audio data, and (f) processing said received audio data.

38. The method of claim 35, further comprising:

(e) determining whether said user has selected all camera angles or a subset thereof for display within a predetermined period of time.

39. The method of claim 35, wherein said step (a) further receives audio data; and further including, (f) outputting portions of said received audio data corresponding to said default camera angle image for display in said highlighted format.

40. The method of claim 35, wherein said portion is a minimum amount of video data to display one of said different camera angle images.

41. An apparatus for reproducing data from a disk, comprising:

a receiving unit to receive at least video data read from the disk;

a processing unit to process portions of said video data to produce image data such that different camera angle images are simultaneously displayed; and a controller receiving user input requesting multiple camera angles for simultaneous display and controlling said processing unit to produce said image data such that a default one of the multiple camera angles for simultaneous display is displayed in a highlighted format.

42. The apparatus of claim 41, wherein said receiving unit receives digital data including said received video data and audio data, and further including, a signal separator separating said received video data and said received audio data.

43. The apparatus of claim 41, wherein said processing unit further comprises:

a video selector separating video data portions corresponding to each camera angle from said received video data, each video data portion being a minimum unit of data to display a camera angle image; and a synthesizer synthesizing at least said separated video data portions to produce image data presenting a synthesized image of multiple camera angle images.

44. The apparatus of claim 43, wherein said controller controls operation of said video selector.

45. The apparatus of claim 41, wherein said portion is a minimum amount of video data to display one of said different camera angle images.

* * * * *